United States Patent [19]

Berneuil et al.

[11] Patent Number: 5,029,439

[45] Date of Patent: Jul. 9, 1991

[54] GAS TURBINE ENGINE INCLUDING A TURBINE BRAKING DEVICE

[75] Inventors: Yves R. J. Berneuil, Paris; Gilles L. E. Delrieu, Montgeron, both of France

[73] Assignee: Societe National D'Etude et de Construction de Moteurs d'Aviation "S.N.E.C.M.A.", Paris, France

[21] Appl. No.: 447,407

[22] Filed: Dec. 7, 1989

[30] Foreign Application Priority Data

Dec. 15, 1988 [FR] France .................. 88 16524

[51] Int. Cl.$^5$ .............................................. F02C 7/00
[52] U.S. Cl. ................................. 60/39.091; 415/9; 415/123
[58] Field of Search ............... 60/39.08, 39.091, 39.31, 60/753; 415/9, 173.7, 197, 217.1, 123; 416/241.13

[56] References Cited

U.S. PATENT DOCUMENTS

| | | | |
|---|---|---|---|
| 3,903,690 | 9/1975 | Jones | 60/226.1 |
| 3,989,407 | 11/1976 | Cunningham | 60/39.091 |
| 4,279,575 | 7/1981 | Avery | 416/241 B |
| 4,639,188 | 1/1987 | Swadley | 415/9 |
| 4,639,399 | 1/1987 | Aprigliano | 416/241 B |

FOREIGN PATENT DOCUMENTS 2131797 11/1972 France .
872654 7/1961 United Kingdom .

Primary Examiner—Louis J. Casaregola
Attorney, Agent, or Firm—Oblon, Spivak, McClelland, Maier & Neustadt

[57] ABSTRACT

A gas turbine engine is provided with a braking device for stopping the compressor drive turbine if a common shaft interconnecting the turbine and compressor rotors breaks, the braking device including a conical ring carried by the turbine rotor at its downstream end and a structural member of a generally conical shape carried by the upstream end of the turbine exhaust casing such that the ring will frictionally interlock with the structural member if the shaft breaks.

4 Claims, 2 Drawing Sheets

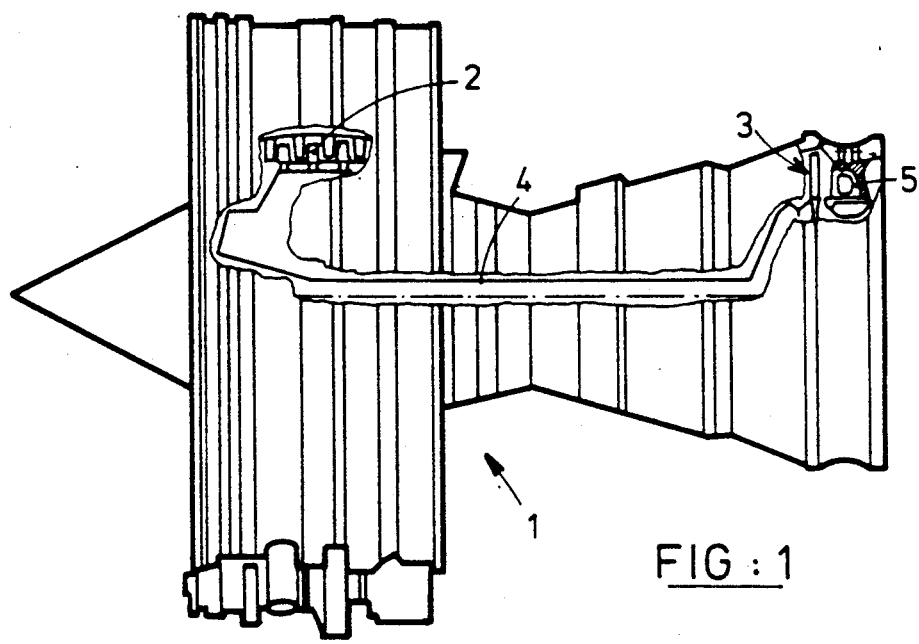
FIG : 1
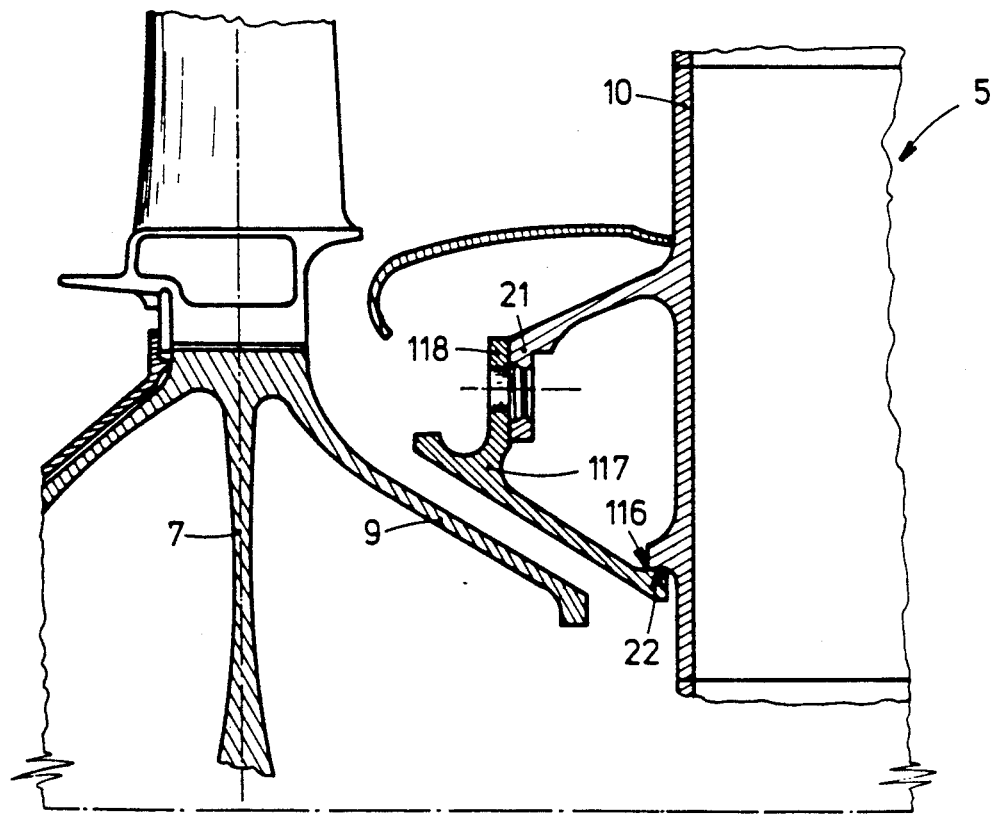
FIG : 3

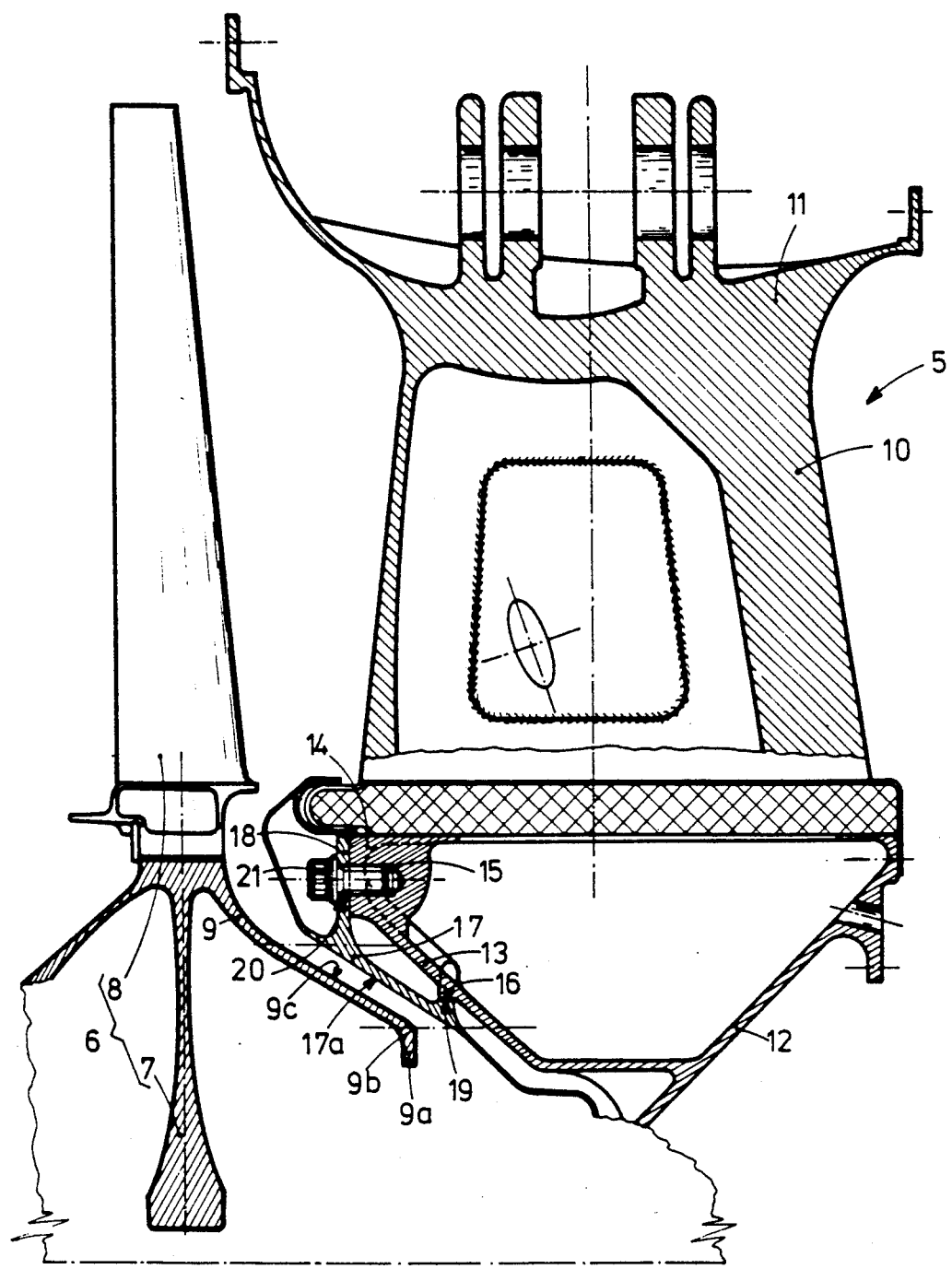
FIG: 2

GAS TURBINE ENGINE INCLUDING A TURBINE BRAKING DEVICE

BACKGROUND OF THE INVENTION

1. Field of the invention

The invention relates to a gas turbine engine which is provided with a braking device for ensuring full control of the rotational speed of the turbine in the event of breakage of the connecting shaft between the turbine and the compressor.

2. Discussion of the prior art

French Patents Nos. 2 052 055 and 2 181 529 relate to the problems raised by the onset of autorotation of a turbojet rotor in the event of a breakdown of the turbojet engine, and propose a solution which achieves immobilization of the rotor without mechanical braking. Instead, the solution makes use of a jet deflection or reverse device associated with the turbojet engine to stop the flow of air which drives the rotor.

A closely related problem is posed by the accidental breakage of a connecting shaft between a compressor and turbine of a turboshaft engine. Indeed, if suitable measures are not taken, this results in the turbine rotor rotating at excessive speeds, with the associated risk of shattering of the rotor leading to damage to the adjoining structures and often catastrophic consequences. French Patent No. 2 131 797 proposes a solution to this problem which involves special mounting arrangements for a rotary unit of the turboshaft engine comprising a thrust bearing situated near the turbine. If the shaft carrying the turbine breaks, these arrangements lead to rubbing of the blades of the turbine rotor against the stationary blading of the stator. Although the blades may be destroyed, more substantial damage and the consequences thereof will be prevented.

It is an object of the invention to provide an improved solution to these problems, particularly for applications where use of previously known solutions is difficult or impossible. In particular, it is an object of the invention to provide a solution which reduces the extent or damage to the parts and prevents destruction of the blades, yet guarantees efficient braking of the turbine rotor and facilitates reconditioning operations after an accident, the implementation of the solution remaining simple and not overburdening the equipment, this being an important criterion, particularly for aeronautical applications.

According to the invention there is provided a gas turbine engine including a compressor and a turbine, said compressor and the turbine each having a rotor, a common shaft interconnecting said compressor and turbine rotors whereby the compressor is driven by said turbine, and an exhaust casing adjacent the downstream end of the turbine in the direction of flow of gases through the turbine, wherein the turbine rotor carries a conical ring at the downstream end thereof, and the exhaust casing carries on the upstream the thereof a structural member of generally conical shape disposed such that, in the event of breakage of the common shaft, the conical portions of the ring and structural member come into contact with each other in a manner which brakes the turbine.

Other features and advantages of the invention will become apparent from the following description of preferred embodiments of the invention, with reference to the attached drawings.

BRIEF DESCRIPTION OF THE DRAWINGS

FIG. 1 is a diagrammatic general view of a gas turbine engine including a turbine braking device in accordance with the invention, partially cut away and showing parts associated with the braking device in longitudinal section in a plane passing through the rotational axis of the engine.

FIG. 2 is a sectional view, on an enlarged scale, of a detail of the engine shown in FIG. 1, illustrating the construction of a first embodiment of the turbine braking device.

FIG. 3 is a partial view similar to FIG. 2 but illustrating a second embodiment of the turbine braking device.

DESCRIPTION OF THE PREFERRED EMBODIMENTS

The gas turbine engine 1 shown diagrammatically in FIG. 1 includes a compressor 2 and a turbine 3 connected by at least one shaft 4, and an exhaust casing 5 at the exit from the turbine.

As shown in greater detail in FIG. 2 illustrating a first embodiment of the invention, the turbine 3 includes at least one last downstream rotor stage 6 formed by a rotor disc 7 supporting mobile blades 8. On its downstream side the disc 7 is appreciably extended by a generally conical ring 9 of which the downstream end terminates at an edge 9a forming a collar and is free under normal conditions of operation of the engine as represented in FIG. 2.

The exhaust casing 5 is formed, in a known manner, with a plurality of radial arms 10 connecting an external envelope 11 of the casing to an inner hub 12. The hub 12 has an upstream part 13 forming an annular collar 14 provided with evenly distributed threaded holes 15 and carrying at about mid-way a longitudinal bearing surface 16. On the upstream side of the hub 12 there is mounted a structural member 17 of a generally conical shape having a radial flange 18 at its upstream end, and a cylindrical bearing surface 19 at its downstream end.

The flange 18 of the structural member 17 is provided with evenly distributed holes 20 and is fixed, by means of screws 21 in the embodiment shown in FIG. 2, to the collar 14 of the casing hub 12. The cylindrical bearing surface 19 of the structural member 17 acts on the cylindrical bearing surface 16 of the casing hub 12. The angle at the vertex of the cone subtended by the ring 9 of the turbine disc is smaller by a few degrees than the angle at the vertex of the cone subtended by the structural member 17 fixed to the casing hub.

If the shaft 4 breaks, the turbine rotor moves downstream and the downstream end 9b of the conical part of the ring 9 comes into contact with the structural member 17 of the casing 5. Consequently, the ring 9b tends to bend at its downstream end and its outer surface 9c slides on the inner surface 17a of the conical structural member 17, producing a wedge effect and a tight conical fitting together between the two parts, resulting in immobilization of the turbine rotor.

To achieve this result without drastic repercussions on the adjacent or joined structures, the surfaces 9c of the ring and 17a of the structural member which come into contact with each other may have a coating possessing good friction resistant properties at high temperatures. This coating is preferably carbon-based and may be formed by a deposition of ceramic type or a composite material with long fibres.

In a second embodiment of the invention shown in FIG. 3 the final stage of the turbine rotor comprising the disc 7 and the conical ring 9 is similar to that described with reference to FIG. 2. However, the method of securing the conical structural member 117 to the exhaust casing 5 is different in a number of respects. The radial flange 118 of the member 117 in this embodiment is secured to a flange 21 which is integral with the upstream face of the casing arms 10, and the cylindrical bearing surface 116 of the member 117 acts on a cylindrical bearing surface 22 which is also carried by the upstream face of the casing arms 10. Braking and locking of the turbine rotor, in the event of the shaft breaking, are achieved in a manner identical with that in the first embodiment described above with reference to FIG. 2, i.e. by contact and tight conical fitting together between the rotor ring 9 and the structural member 117 of the casing.

Obviously, numerous modifications and variations of the present invention are possible in light of the above teachings. It is therefore to be understood that within the scope of the appended claims, the invention may be practiced otherwise than as specifically described herein.

What is claimed is:

1. A gas turbine engine, which comprises:

a compressor and a turbine, said compressor and said turbine each having a rotor;

a common shaft interconnecting said compressor and turbine rotors whereby said compressor is driven by said turbine; and an exhaust casing located adjacent the downstream end of said turbine in the direction of flow of gases through said turbine, wherein said turbine rotor carries a conical ring at the downstream end thereof, and said exhaust casing carries on the upstream side thereof a structural member of generally conical shape disposed such that, in the event of breakage of said common shaft, the conical portions of said ring and said structural member come into contact with each other in a manner which brakes the turbine;

said exhaust casing including a hub, and said conical structural member being secured to said hub on the upstream side thereof; and the upstream part of said exhaust casing hub facing said structural member including a cylindrical bearing surface, and said structural member including a cylindrical bearing surface cooperating with said bearing surface of said hub, said structural member also including, at its upstream end, a radial flange through which said structural member is secured to said exhaust casing hub.

2. A gas turbine engine, which comprises:

a compressor and a turbine, said compressor and said turbine each having a rotor;

a common shaft interconnecting said compressor and turbine rotors whereby said compressor is driven by said turbine; and an exhaust casing located adjacent the downstream end of said turbine in the direction of flow of gases through said turbine, wherein said turbine rotor carries a conical ring at the downstream end thereof, and said exhaust casing carries on the upstream side thereof a structural member of generally conical shape disposed such that, in the event of breakage of said common shaft, the conical portions of said ring and said structural member come into contact with each other in a manner which brakes the turbine;

said exhaust casing including radial arms having, on the upstream face thereof, a cylindrical bearing surface and an integral collar, and said structural member including, at the downstream end thereof, a cylindrical bearing surface cooperating with said bearing surface of said radial arms, said structural member also including, at its upstream end, a radial flange connected to said collar.

3. A gas turbine engine according to claim 1, wherein the facing faces of said conical ring and said conical structural member are provided with a coating having good friction resistance properties at high temperatures.

4. A gas turbine engine according to claim 2, wherein the facing faces of said conical ring and said conical structural member include a coating having good friction resistance properties at high temperatures.

* * * * *

UNITED STATES PATENT AND TRADEMARK OFFICE
CERTIFICATE OF CORRECTION

PATENT NO. : 5,029,439

DATED : July 9, 1991

INVENTOR(S) : Yves R. J. Berneuil, et al

It is certified that error appears in the above-identified patent and that said Letters Patent is hereby corrected as shown below:

In column 2, line 55, delete "9$b$" and insert --9--.

Signed and Sealed this

Twenty-third Day of March, 1993

*Attest:*

STEPHEN G. KUNIN

*Attesting Officer*      *Acting Commissioner of Patents and Trademarks*